United States Patent [19]

Theisen et al.

[11] Patent Number: 5,500,162
[45] Date of Patent: Mar. 19, 1996

[54] PROCESS AND DEVICE FOR PRODUCING MICROSPHERES

[75] Inventors: Wolfgang Theisen; Edwin Brauneis, both of Rodenbach; Bernd Pirstadt, Ahorn, all of Germany

[73] Assignee: Nukem GmbH, Alzenau, Germany

[21] Appl. No.: 170,309

[22] PCT Filed: May 4, 1993

[86] PCT No.: PCT/EP93/01082

§ 371 Date: May 13, 1994

§ 102(e) Date: May 13, 1994

[87] PCT Pub. No.: WO93/22045

PCT Pub. Date: Nov. 11, 1993

[30] Foreign Application Priority Data

May 4, 1992 [DE] Germany .................. 42 14 272.5

[51] Int. Cl.⁶ .................................................. B29B 9/10
[52] U.S. Cl. .................................. 264/9; 264/14; 425/6; 425/10
[58] Field of Search .................. 264/4, 5, 9, 14; 425/5, 6, 10

[56] References Cited

U.S. PATENT DOCUMENTS

| | | |
|---|---|---|
| 3,380,894 | 4/1968 | Flack . |
| 3,845,179 | 4/1970 | Wace ............................. 264/14 |
| 3,886,086 | 5/1975 | Simpson . |
| 3,957,933 | 5/1976 | Egli et al. ...................... 264/14 |
| 4,043,507 | 8/1977 | Wace ......................... 239/102.2 |
| 4,063,856 | 12/1977 | Dziedzic ......................... 425/5 |
| 4,285,645 | 8/1981 | Bezzi et al. ..................... 425/6 |
| 4,347,200 | 8/1982 | Bezzi et al. ..................... 264/9 |
| 4,692,284 | 9/1987 | Braden ......................... 425/5 |
| 5,223,185 | 6/1993 | Takei et al. ..................... 425/10 |

FOREIGN PATENT DOCUMENTS

| | | |
|---|---|---|
| 2016907 | 10/1970 | Del. . |
| 0277406 | 2/1987 | European Pat. Off. . |
| 2302779 | 1/1976 | France . |
| 2387076 | 4/1978 | France . |
| 2501058 | 3/1982 | France . |
| 1592536 | 6/1964 | Germany . |
| 2221644 | 11/1972 | Germany . |
| 2230914 | 12/1972 | Germany . |
| 2602370 | 9/1976 | Germany . |
| 2822370 | 12/1978 | Germany . |
| 2816059 | 12/1979 | Germany . |
| 207862 | 7/1982 | Germany . |
| 3208047 | 7/1985 | Germany . |
| 3208048 | 7/1988 | Germany . |
| 389826 | 3/1975 | U.S.S.R. . |
| 1719047 | 11/1989 | U.S.S.R. . |
| 1577812 | 7/1990 | U.S.S.R. . |
| 1105325 | 3/1968 | United Kingdom . |
| 2094283 | 3/1982 | United Kingdom . |
| 2094771 | 3/1982 | United Kingdom . |
| 2122915 | 6/1983 | United Kingdom . |

OTHER PUBLICATIONS

European Search Report.

*Primary Examiner*—Mary Lynn Theisen
*Attorney, Agent, or Firm*—Cushman Darby & Cushman

[57] ABSTRACT

A process and device are disclosed for producing microspheres by vibration-provoked dripping of a liquid through a nozzle plate (12) provided with several openings (14). In order to be able to produce spheres having up to 5 mm size, the same amount of liquid per unit of time drips through each opening (14) of the nozzle plate (12). The falling drops (18) form an envelope surrounded from all sides by flowing reaction gas. The reaction gas is introduced inside or outside the envelope and sucked away inside or outside the envelope.

16 Claims, 3 Drawing Sheets

2

PROCESS AND DEVICE FOR PRODUCING MICROSPHERES

BACKGROUND OF THE INVENTION

1. Field of the Invention

The invention refers to a method for producing microspheres by means of vibration-stimulated dripping of liquid through a plurality of openings of a nozzle plate, the droplets taking on a spherical shape while falling through a first free-fall section and then, in a second free-fall section, being exposed to a reaction gas to produce gelling, thereafter falling into a reaction liquid which may possess a foam layer.

The invention further refers to an apparatus for producing microspheres, comprising a nozzle plate which has a plurality of openings for dripping a liquid and can be caused to vibrate; a reaction free-fall section in which the droplets falling from the nozzle plate react with a reaction gas; and a reaction liquid, present below the free-fall section in a vessel, which may be covered with a foam.

2. Description of the Prior Art

A corresponding method and apparatus are disclosed by DE 28 16 059 C3, referring to the production of a pelletized nuclear fuel; the resulting uranium oxide pellets have a diameter of approximately 80 um. It has been found in practice that larger spheres, in the range up to approximately 5 mm, cannot be produced with a corresponding method or apparatus, especially not in industrial-scale facilities.

Also known in addition to vibration-stimulated dripping is the gravity drip technique, although with this only small dripping rates of approximately 1 to 10 droplets per nozzle per second can be achieved.

SUMMARY OF THE INVENTION

The underlying problem of the present invention is to develop a method and an apparatus of the aforesaid type in such a way that spheres of sufficiently uniform geometry can be produced with diameters in the range up to 5 mm, allowing the possibility of scale-up to industrial-scale facilities.

In terms of the method, the problem is substantially solved by the fact that the same quantity of liquid passes through each opening in the nozzle plate per unit time; that the falling droplets form an envelope around which the reaction gas flows on all sides; and that reaction gas is introduced peripherally inside or outside the envelope, and is extracted outside or inside the envelope.

According to the invention the liquid, for example a dispersion, emerges through a plurality of openings, for example nozzle orifices, arranged in one or more circles arranged concentrically with one another, at identical volumetric flows, and is turned into droplets as the nozzle plate is caused to vibrate periodically. The result is to form a "droplet wall" referred to as an envelope, which may for example have the geometrical form of a hollow cylinder.

In the first free-fall section, the droplets emerging from the openings are then given the opportunity to take on a spherical shape before they reach the second freefall section, in which the spherical shape is stabilized by the fact that the droplets are stimulated to a sol-gel reaction by exposure to a reaction gas. The droplets, in a stable spherical shape, then reach the reaction liquid; before this, either they are decelerated in a foam present on the liquid, or reaction liquid is directed onto the falling droplets tangentially (or substantially tangentially) to and in the same direction as the direction in which the droplets are falling. The two features ensure that the droplets are not deformed, for example flattened, when they strike the reaction liquid present in a vessel.

In particular, the droplets are enveloped by and exposed on all sides to a reaction gas which is delivered from inside the envelope and extracted outside the envelope, extraction occurring between the gas inlet and the nozzles.

In terms of the apparatus, the problem is solved by the fact that a gas delivery device delivering the reaction gas is arranged inside the reaction free-fall section, inside or outside an envelope formed by apparent attachment of the falling droplets; that an extraction device extracting reaction gas is arranged outside or inside the envelope; and that a device generating the foam is arranged inside and/or outside the envelope in the reaction liquid, or that a reaction liquid distribution device is arranged and configured, above the liquid level and concentrically with the envelope, in such a way that reaction liquid can be directed onto the falling droplets tangentially to and in the same direction as the direction in which the droplets are falling.

Preferably the envelope is in the shape of a hollow cylinder, coaxially with which the gas delivery device, extraction device, and annular chamber are arranged.

The gas delivery device itself is part of an annular reaction chamber or delimits the latter, and can be arranged inside the envelope in such a way as to ensure that reaction gas flows around the falling droplets on all sides so that the necessary sol-gel reaction can proceed.

The gas can be delivered through an annular gap, adjustable in height and/or width, from inside the envelope; the gas flows through a dished lower element against a surface extending above it which together with the circumferential upper rim of the dished element delimits the annular gap.

This results in the advantage that the free-fall section in which the spheres are shaped can be modified to the point of an intense impacting flow of reaction gas. The outflow velocity of the radially emerging reaction gas can also be modified, which in turn influences the chemical reaction when the spheres gel.

The gas delivery device, or an additional such device, can also surround the envelope.

The extraction device, which can surround the envelope in annular fashion, is preferably arranged above the gas delivery device, i.e. between it and the nozzle plate.

To achieve optimum conditions, the extraction device and the gas delivery device can be arranged on opposite sides of the envelope.

Another embodiment of the invention provides for the annular chamber generating the foam to extend at least in part inside the reaction liquid.

To ensure that the droplets falling into the reaction liquid are not flattened when they strike the surface of the liquid, a foam cushion causing deceleration does not necessarily need to be present. In some cases this can in fact be detrimental, since the reaction liquid will become enriched with surfactants, thus potentially contaminating the spheres being produced. Dissolved surfactants can also lead to uncontrolled foaming in the liquid circulation system.

A proposal that independently enjoys protection therefore provides for the droplets to be directed onto a mushroom-shaped reaction liquid distribution device, on whose surface reaction liquid flows tangentially (or substantially tangentially) to the direction in which the droplets are falling, and in the same direction. Reaction liquid is delivered to the distribution device and guided along it so as to form a laminar flow layer whose thickness is adjustable.

As a result of these features, the falling droplets are received gently, thus excluding deformation when they strike the liquid surface. Instead, the layer of reaction liquid envelops the droplets as they flow along on the distribution device, so that sudden impact onto the liquid surface cannot occur.

Further details, advantages, and features of the invention are evident not only from the claims and the features that may be inferred therefrom—either individually and/or in combination—but also from the description below of an exemplary embodiment and from the examples described.

BRIEF DESCRIPTION OF THE DRAWINGS

In the Figures.

DESCRIPTION OF THE PREFERRED EMBODIMENT

Figure 1:
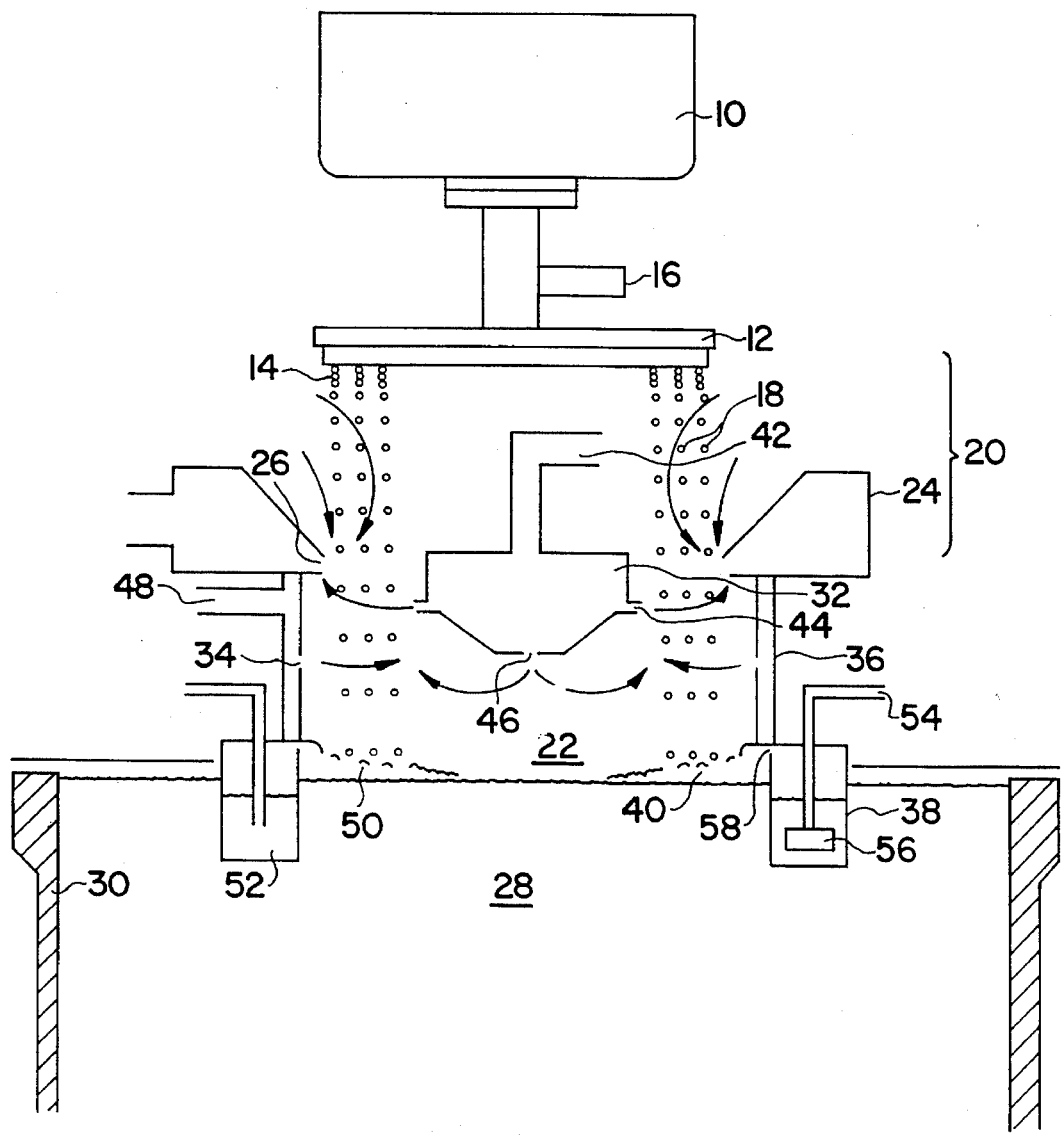
FIG. 1 shows a schematic depiction of an apparatus for producing microspheres.

FIG. 1 shows, in purely schematic form, an apparatus for producing spheres preferably up to a size of approximately 5 mm, with large volume throughputs, by vibration-stimulated dropping of liquids such as dispersions, which in order to form the spheres experience a sol-gel reaction and are solidified in a reaction liquid. A heat treatment, for example firing and sintering, can follow in the usual manner.

The apparatus according to the invention comprises a nozzle plate (12), caused to vibrate by a vibration exciter (10), which has a plurality of nozzle openings (14) that preferably are arranged in rings running concentrically with one another. A dispersion delivered to the nozzle plate (12) via the connector (16) passes through the openings; the same quantity of liquid emerges from each opening (14) for each unit of time.

The result of this feature is to generate a stable "droplet wall" in the form of an envelope, which for example can have the geometrical shape of a hollow cylinder. In the exemplary embodiment, in which the nozzle openings are arranged in three rings running concentrically with one another, the envelope consists in itself of three sheaths arranged concentrically with one another. For simplicity's sake, however, these are always referred to as a single envelope.

According to the invention, the nozzle plate (12) is attached (preferably elastically) to a mounting device; a vibration exciter (10) which causes the nozzle plate (12) to vibrate is coupled to the nozzle plate (12) so as to vibrate freely at least in the direction of the long axis of the nozzles. As a result, the vibration exciter (10) no longer needs to bear the weight of the nozzle plate (12), but can be designed solely to generate an optimum vibration. The return force of the nozzle plate (12) is generated by a spring mount.

Droplets (18) emerging from the openings (14) fall through a first free-fall section (20) in which the droplets (18), because of their cohesive forces, have sufficient time to assume a spherical shape before they enter an annular reaction chamber (22) that can also be referred to as the second free-fall section or reaction free-fall section.

The purpose of the reaction chamber (22) is to stabilize the spherical shape of the falling droplets (18) due to the fact that a sol-gel reaction occurs by exposure to a reaction gas.

The reaction chamber is delimited toward the nozzle plate by an extraction device (24) that forms a circumferential extraction ring (26). Between the extraction ring (26) and the surface of a reaction liquid (28) that is located in a vessel (30), the reaction gas needed to activate the sol-gel reaction is delivered through a nozzle device (32) arranged in the center of the reaction chamber (22) and therefore of the envelope, and/or through a nozzle ring, (34) arranged externally, which proceeds from a hollow cylindrical partition wall (36) which delimits the reaction chamber (22) externally and extends between the extraction device (24) and an annular chamber (38) through which a foam (40) is delivered onto the surface of the reaction liquid (28).

The gas delivery device (32) is supplied with reaction gas through a conduit (42), and then delivers it through a peripheral slot (44) or an opening (46) arranged centrally and provided on the underside of the gas delivery device (32).

This ensures that reaction gas flows around the falling droplets (18) on all sides, thus ensuring stabilization of the droplets (18), which are already spherical in shape, as the sol-gel reaction proceeds.

The external annular nozzle (34) is supplied with reaction gas through an annular chamber (48).

Alternatively, of course, it would be possible for the extraction device to be arranged in the center of the reaction chamber (22), and for the reaction gas to be supplied substantially from outside.

The foam (40) delivered from the annular chamber (38), which acts more or less as a foam cushion, is designed to decelerate the falling droplets before they strike the liquid surface (50). Located in the annular chamber (38), portions of which extend inside the reaction bath (28), is a surfactant solution (52) that is foamed by blowing in small air bubbles through a conduit (54) and a distribution tube (56); the foam is positively delivered onto the liquid (28) through an annular gap (58) extending above the reaction liquid surface (50).

Due to the composition and size of the liquid droplets, the foam cushion may be dispensed with as applicable. The foam can also be replaced or supplemented by features that will be described in conjunction with FIG. 3.

Figure 2:
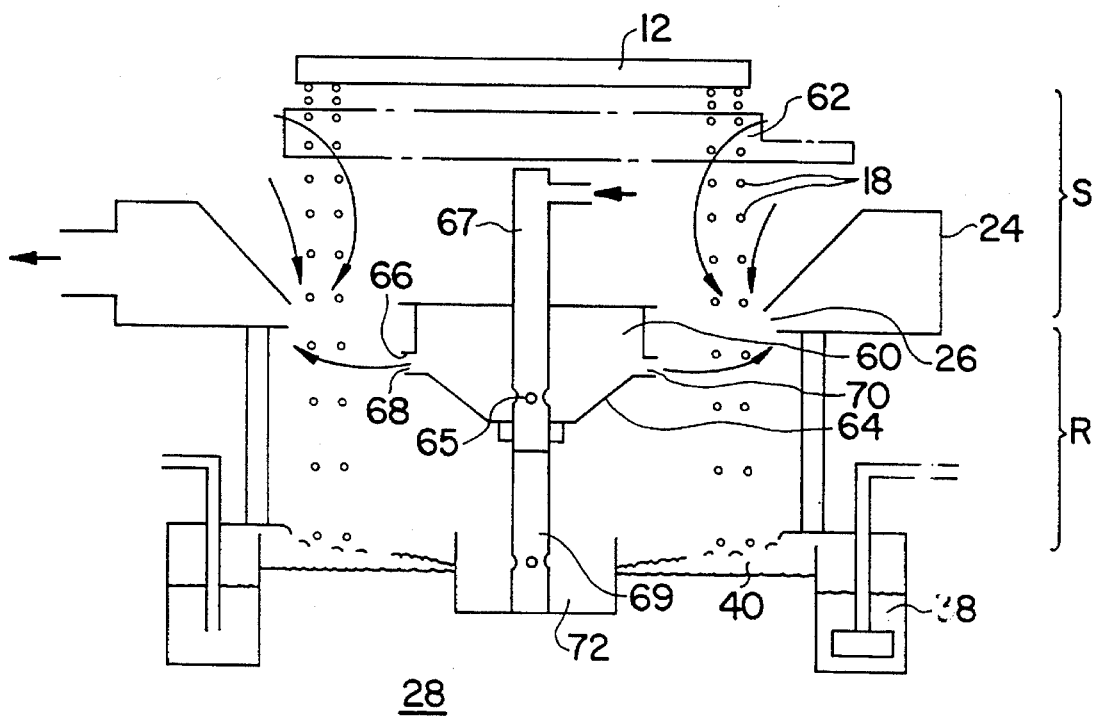
FIG. 2 shows details of a preferred apparatus for producing microspheres.

FIG. 2 depicts details of a preferred embodiment of an apparatus for producing microspheres, which in terms of the method is operated in accordance with the apparatus according to FIG. 1. All identical elements are therefore given the same reference numbers throughout.

The droplets emerging from the nozzle plate (12) first fall through a section S in which they are merely formed into a spherical shape, with no sol-gel reaction occurring due to exposure to the reaction gas. After falling through the section S, the droplets encounter the influence of a reaction gas delivered from a device (60) arranged centrally, i.e. inside an envelope formed by the droplet wall. The reaction gas coming from the device (60) is extracted by the extraction apparatus (24) which concentrically surrounds the envelope and has the annular gap (26) already described.

As FIG. 2 shows, the device (60) for delivering reaction gas, which extends inside the envelope, is arranged below the annular gap (26) of the extraction apparatus (24). The device comprises a dished lower element (64) along whose inner surface the reaction gas, which is introduced through openings (65) and is delivered through an annular gap (70) toward the envelope, is guided. The annular gap (70) is formed by the upper, preferably horizontal, circumferential rim (68) and a surface (66) located at a distance from the latter. To allow adjustment of the width of the annular gap (70), the dished element (64) is designed so that its distance from the surface (66) can be modified. The height of the device (60) itself can also be adjusted.

The element (64) can be displaced along a tube (67) in which are located the openings (65) through which the reaction gas is conveyed.

The tube (67) itself continues into a support tube (69). A cup-shaped reservoir (72), in which foam is generated, is arranged in the reaction liquid (28) concentrically with the tube (69).

The annular chamber (38) with which foam is generated as in the exemplary embodiment according to FIG. 1 is arranged outside the envelope.

A pivoting droplet collector (62) can be arranged between the nozzle plate (12) and reaction free-fall section (R), and can then be removed from the droplet free-fall section (S) when the droplets are being generated in the desired uniform shape (once stable operating conditions have been achieved).

Also worth mentioning with regard to the device delivering the reaction gas is that by means of radial incoming flow, it allows intensive delivery of gas to the droplets as they fall past. In addition it is possible—as in FIG. 1—to provide, outside the envelope, a further device to deliver reaction gas.

The device delivering reaction gas, consisting of the elements (60), (64), (66), (67), and (68), furthermore performs the function of a displacement member, to ensure complete and reliable extraction of the reaction gas through the annular gap (26) of the extraction device (24).

Figure 3:
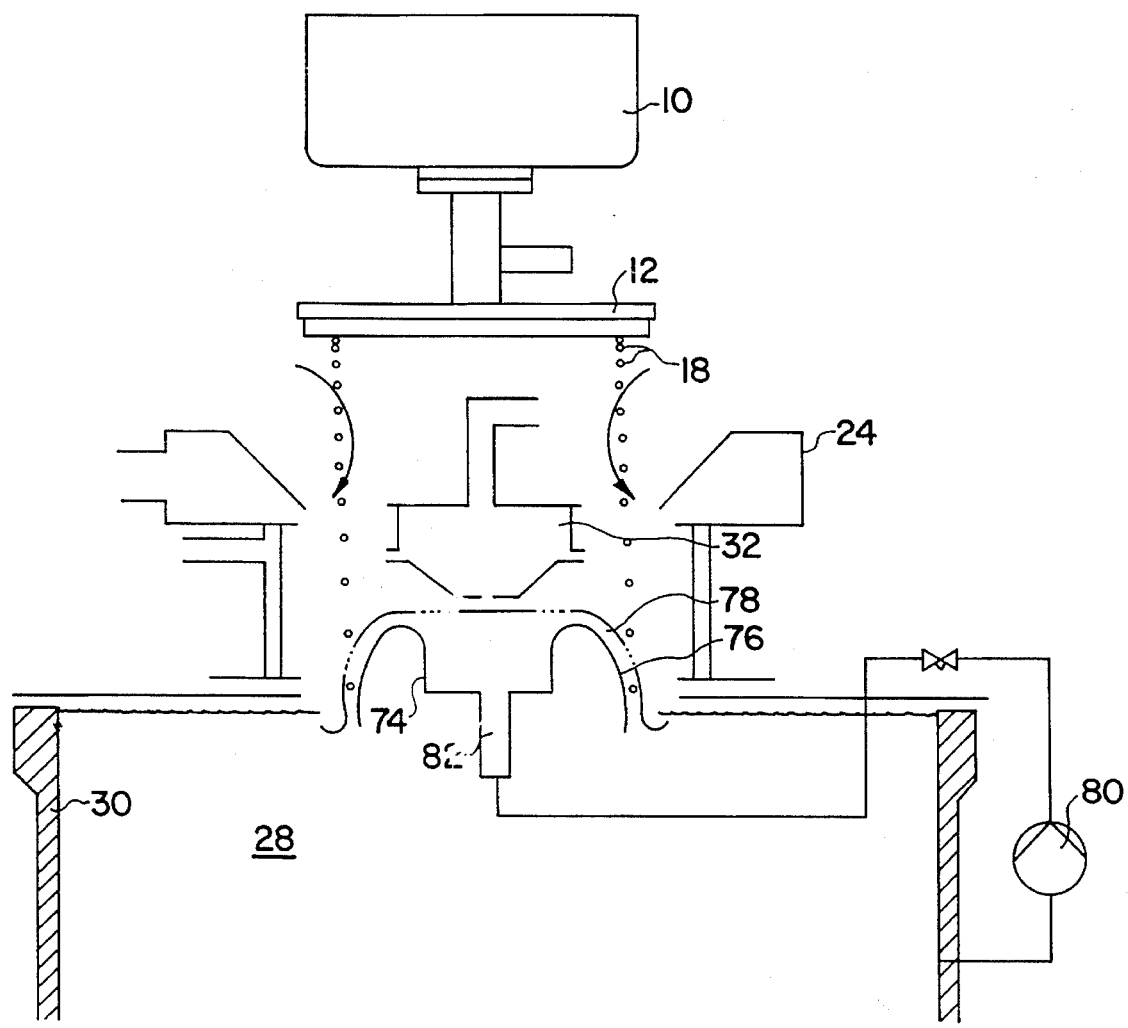
FIG. 3 shows a schematic depiction of a further embodiment of an apparatus for producing microspheres.

FIG. 3 depicts a further embodiment of an apparatus for producing microspheres, wherein vibration-stimulated dripping and presolidification, as well as the subsequent sol-gel reaction, occur in accordance with the exemplary embodiments according to FIGS. 1 and 2.

In contrast thereto, however, no foam layer is generated on the surface of the reaction liquid. Instead a reaction liquid distribution device (74) that projects out from the liquid (28) is arranged concentrically with the envelope formed by the droplets (18).

A reaction liquid layer (78) that flows in laminar or substantially laminar fashion along the surface (76) is generated along the surface (76) of the device (74).

In order to supply the distribution device (74) with reaction liquid, reaction liquid is conveyed from the container (30) by a circulation pump (80) to a central orifice (82) in the device (74), and is then delivered radially onto the surface (76). The thickness of the layer (78) can be adjusted in accordance with the quantity delivered.

The dimensions of the device (74) are matched to the envelope formed by the droplets (18) in such a way that the flow layer (78) is directed onto the envelope formed by the droplets (18) tangentially and in the same direction. The layer (78) therefore receives the droplets (18) gently, and offers sufficient protection against deformation as they enter the reaction liquid.

As mentioned, the thickness of the liquid layer (78) on the surface (76) of the mushroom-shaped device (74) can be altered in order to adjust to microsphere production.

The proposal [sic] according to the invention can be used for all microsphere production methods, such as sol-gel methods, alginate methods, melting methods for plastics, etc.

The method according to the invention can be used to produce, for example, $Al_2O_3$ spheres or plastic spheres up to a diameter of 5 mm.

The method will be explained in more detail below with reference to an exemplary embodiment from which further details and features may be inferred.

An $Al_2O_3$ dispersion with a solids content of approximately 20% and a viscosity of 25 to 75 mPa.s is conveyed to the nozzle plate (12), which is provided with two circles arranged concentrically with one another. The dispersion is preferably dripped with a frequency in the range from 20 to 100 Hz.

Once a uniform and stable droplet image is seen in the stroboscopic light, the droplet collector (62) previously arranged beneath the nozzle head (12) is swung aside so the droplets can fall through the reaction free-fall section R.

The free-fall section S within which no reaction gas acts on the droplets is between 5 and 15 cm long. The reaction free-fall section R, within which the extraction device (24) or extraction gap (26) and reaction gas delivery device (60) are arranged, has the same length.

Arranged below the reaction free-fall section R is the reaction liquid (28), which is deionized water with approximately 2 to 10% $NH_4OH$ added.

The liquid has a foam carpet with a thickness of approximately 5 to 20 mm, which is generated by the delivery of foam from the annular chamber (38) or central chamber (72).

For this purpose, the annular chamber (38) or central chamber (72) contains a surfactant solution that is foamed by blowing in small air bubbles. The foam is then forced to emerge through an annular gap and cover the liquid surface.

The spheres falling into the liquid (28) partly destroy the foam layer. Consumption of surfactant for foam generation is compensated for by the addition of fresh surfactant solution; this process allows delicate adjustment of the foam layer thickness, and individual adaptation of the deceleration effect.

The installation used can consist of four structurally identical units of compact design above the reaction liquid, which in turn is provided jointly for all the units. Of course a separate annular chamber (38) for foam production is associated with each dripping unit, so that the desired individual adjustments can be made.

Each unit can drip approximately 50 to 150 liters of dispersion per hour. The spheres removed from the reaction liquid and then heat-treated have a regular spherical shape; fluctuations in diameter have proved to be less than 4%.

We claim:

1. Method for producing microspheres by means of vibration-stimulated dripping of liquid through a plurality of openings (14) of a nozzle plate (12), the droplets (18) taking on a spherical shape while falling through a first free-fall section (20, S) and then, in a second free-fall section (R), being exposed to a reaction gas to produce gelling, thereafter falling into a reaction liquid (28) which may possess a foam layer (40), in which the same quantity of liquid passes through each opening (14) of the nozzle plate (12) per unit time; that the falling droplets (18) form an envelope around which, in the second free-fall section (R), the reaction gas flows on all sides; and that reaction gas is introduced inside and extracted outside the envelope, or is introduced outside and extracted inside the envelope.

2. Method according to claim 1, in which reaction liquid (78) is directed onto the falling droplets (18) tangentially or substantially tangentially to and in the same direction as the direction in which the droplets are falling.

3. Method according to claim 1, in which the droplets (18) fall onto a laminar reaction liquid flow layer (78) whose thickness is adjustable.

4. Method according to claim 2, in which the droplets (18) fall onto a laminar reaction liquid flow layer (78) whose thickness is adjustable.

5. Apparatus for producing microspheres, comprising a nozzle plate (12) which has a plurality of openings (14) for dripping a liquid and can be caused to vibrate; a reaction free-fall section (R), spaced away from the nozzle plate, in which droplets (18) falling from the nozzle plate react with a reaction gas; and a reaction liquid (28), present below the free-fall section in a vessel (30), which if applicable can be covered with a foam (40), in which a gas delivery device (32) delivering the reaction gas is arranged inside the reaction free-fall section inside or outside an envelope formed by apparent attachment of the falling droplets (18); that an extraction device (24, 26) extracting reaction gas is arranged outside the envelope if the gas delivery device (32) is inside, or inside the envelope if the gas delivery device (32) is outside; and that a device (38,72) to generate the foam (40) is arranged inside and/or outside the envelope in the reaction liquid (28), or that a reaction liquid distribution device (74) is arranged and configured, above the liquid level and concentrically with the envelope, in such a way that reaction liquid (78) can be directed onto the falling droplets (78) tangentially or substantially tangentially to and in the same direction as the direction in which the droplets are falling.

6. Apparatus according to claim 5, in which the extraction device (24, 26) is arranged above a gas delivery device (60, 62) which delivers reaction gas.

7. Apparatus according to claim 5, in which the gas delivery device (60) comprises a dished element (64) that is arranged so that its spacing can be varied with respect to a surface (66) that, with the upper rim (68) of the element, delimits an annular gap (70).

8. Apparatus according to claim 5, in which the envelope is in the shape of a hollow cylinder, coaxially with which the gas delivery device (32, 34), extraction device (24, 26), and the device (38) for generating the foam are arranged.

9. Apparatus according to at least claim 5, in which the gas delivery device (60) which delivers reaction gas on all sides is arranged inside the envelope.

10. Apparatus according to one of claims 4–8, in which the extraction device (24, 26) surrounds the envelope in annular fashion.

11. Apparatus according to one of claims 4–8 in which the device (72) generating the foam (40) is arranged in the region of the long axis of the envelope inside the reaction liquid (28).

12. Apparatus according to one of claims 4–8, in which the device (38) generating the foam is an annular chamber, surrounding the envelope, with a foam gap (58).

13. Apparatus according to one of claims 4–8, in which a removable droplet collector (62) is arranged between the nozzle plate (12) and the extraction device (24, 26).

14. Apparatus according to at least claim 4, in which the reaction liquid distribution device (74) has a mushroom-shaped surface (76) with an opening for reaction liquid, such that a laminar flow layer of reaction liquid forms on the surface of the reaction liquid distribution device.

15. Apparatus according to one of claims 4–8, in which the thickness of the flow layer (78) is adjustable.

16. Apparatus for producing microspheres, comprising a nozzle plate (12) which has a plurality of openings (14) for dripping a liquid and can be caused to vibrate; a reaction free-fall section (R), spaced away from the nozzle plate, in which droplets (18) falling from the nozzle plate react with a reaction gas; and a reaction liquid (28), present below the free-fall section in a vessel, which if applicable can be covered with a foam (40), in which the nozzle plate (12) is attached elastically to a mounting device; that the nozzle plate is attached to a vibration exciter which is coupled to the nozzle plate (12) so as to vibrate freely at least in the direction of the falling droplets; that a gas delivery device (60) delivering the reaction gas is arranged inside an envelope formed by apparent attachment of the falling droplets (18); that the reaction gas is delivered through an annular gap (40) with variable spacing, and can be extracted through a further annular gap (26), extending above the annular gap (70), that is arranged outside the envelope; and that a device (38, 72) for generating the foam (40) is arranged inside and/or outside the envelope in the reaction liquid (28), or that a reaction liquid distribution device (74) is arranged and configured, above the liquid level and concentrically with the envelope, in such a way that a reaction liquid (78) can be directed onto the falling droplets (18) tangentially or substantially tangentially to and in the same direction as the direction in which the droplets are falling.

* * * * *